United States Patent
Devarakonda et al.

(10) Patent No.: US 11,038,623 B2
(45) Date of Patent: Jun. 15, 2021

(54) EFFICIENT EXTENSION TO VITERBI DECODER FOR TCM ENCODED AND NON-LINEAR PRECODED INPUTS

(71) Applicant: Intel Corporation, Santa Clara, CA (US)

(72) Inventors: Murti Devarakonda, Bengaluru (IN); Rainer Strobel, Munich (DE); Christo Thomas, Bangalore (IN); Puneet Bhatia, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 835 days.

(21) Appl. No.: 15/634,240

(22) Filed: Jun. 27, 2017

(65) Prior Publication Data

US 2018/0337750 A1 Nov. 22, 2018

Related U.S. Application Data

(60) Provisional application No. 62/509,297, filed on May 22, 2017.

(51) Int. Cl.
*H04L 27/38* (2006.01)
*H04L 1/00* (2006.01)

(52) U.S. Cl.
CPC ............ *H04L 1/0054* (2013.01); *H04L 27/38* (2013.01); *H04L 1/006* (2013.01); *H04L 1/0045* (2013.01)

(58) Field of Classification Search
CPC ... H04B 1/38; H04B 7/02; H04B 7/04; H04B 7/0417; H04B 7/0452; H04B 15/00;
(Continued)

(56) References Cited

U.S. PATENT DOCUMENTS

| 8,416,673 B1 | 4/2013 | Hovakimyan et al. |
| 2010/0208837 A1* | 8/2010 | Vetter ................. H04L 27/2602 375/267 |
| 2012/0224660 A1* | 9/2012 | Lee ......................... H04L 27/38 375/341 |

OTHER PUBLICATIONS

Ginis, George et al. "A Multi-user Proecoding Scheme achieving Crosstalk Cancellation with Application to DSL Systems." Conference Paper in Circuits, Systems and Computers, 1977, Conference Record, 1977 11th Asilomar Confernece on Dec. 2000, 6 pages.

* cited by examiner

*Primary Examiner* — Shawkat M Ali
(74) *Attorney, Agent, or Firm* — 2SPL Patent Attorneys PartG mbB; Yong Beom Hwang

(57) ABSTRACT

A decoder circuit that supports non-linear precoded signals is disclosed. The decoder circuit comprises a modulo estimation circuit configured to receive a non-linear pre-coded quadrature amplitude modulated (QAM) data symbol and determine a modulo shift estimate associated with the received QAM data symbol, wherein the modulo shift estimate comprises a modulo shift that brings the received QAM symbol within the predetermined QAM constellation. The decoder circuit further comprises a QAM decoder circuit configured to map the received QAM data symbol to a winning constellation point, wherein the winning constellation point comprises a constellation point in an extended QAM constellation associated with the predetermined QAM constellation, and determine a quantized constellation point comprising a constellation point within the predetermined QAM constellation from the winning constellation point, based on applying the modulo shift corresponding to the modulo shift estimate to the winning constellation point.

25 Claims, 10 Drawing Sheets

(58) Field of Classification Search
CPC ....... H04J 1/12; H04J 3/06; H04J 3/10; H04L 1/00; H04L 1/006; H04L 1/0054; H04L 7/00; H04L 25/03; H04L 27/06; H04L 27/12; H04L 27/26; H04L 27/38
USPC ........ 370/201, 465, 480, 519; 375/219, 253, 375/260, 261, 267, 316, 341; 714/755, 714/792, 810
See application file for complete search history.

FIG. 2b

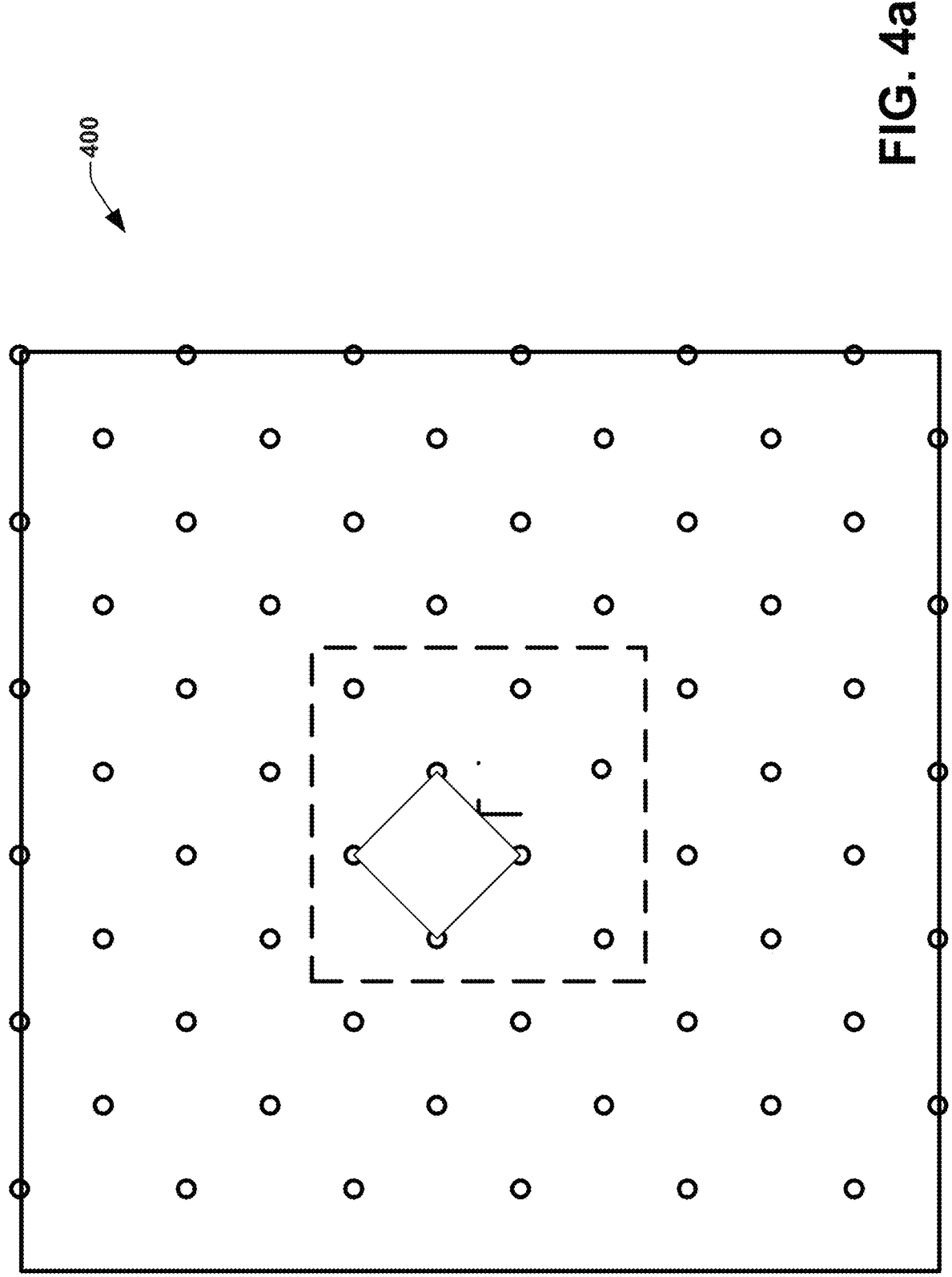

EFFICIENT EXTENSION TO VITERBI DECODER FOR TCM ENCODED AND NON-LINEAR PRECODED INPUTS

REFERENCE TO RELATED APPLICATIONS

This application claims the benefit of provisional Application No. 62/509,297, filed May 22, 2017, entitled "AN EFFICIENT EXTENSION TO VITERBI DECODER FOR TCM ENCODED AND NON-LINEAR PRECODED INPUTS", the contents of which are herein incorporated by reference in their entirety.

FIELD

The present disclosure relates to the field of decoders, and in particular to a method and an apparatus for decoding non-linear precoded data symbols in communication systems.

BACKGROUND

In certain communication systems, for example, wireline communication systems, crosstalk cancellation is performed by applying non-linear modulo operations on the transmitted quadrature amplitude modulated (QAM) symbols by a method called as non-linear precoding. Examples include Tomlinson-Harashima precoding, Vector precoding and other similar schemes that use modulo arithmetic. The transmitter performs a modulo on the QAM symbols by taking the remainder of a division and ignoring the quotient. The receiver sees only a noisy version of this remainder and has to extract the missing quotient in order to pass the inputs to a decoder, for example, a Viterbi decoder, thereby requiring additional processing at the receiver side. A naïve implementation leads to very complex pre-processing at the receiver.

BRIEF DESCRIPTION OF THE DRAWINGS

Some examples of circuits, apparatuses and/or methods will be described in the following by way of example only. In this context, reference will be made to the accompanying Figures.

FIG. 2b shows an example of extended 3-bit diamond QAM constellation (DDC), according to one embodiment of the disclosure.

FIG. 4a and FIG. 4b shows an original extended 3-bit diamond constellation and a rotated extended 3-bit diamond constellation, respectively, according to one embodiment of the disclosure.

DETAILED DESCRIPTION

Figure 1A:
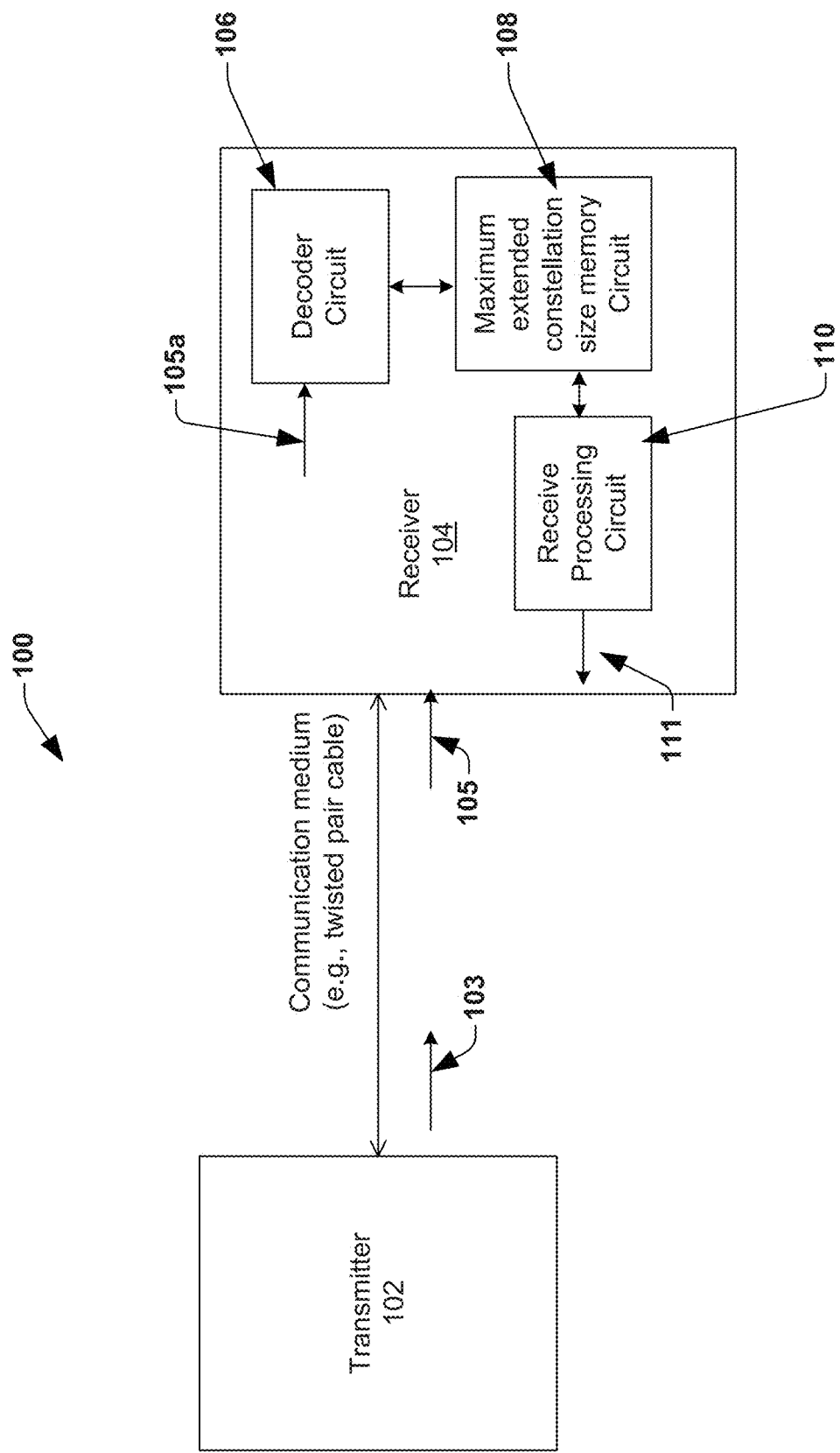
FIG. 1a illustrates a simplified block diagram of an exemplary communication system that supports modulo precoded signals or non-linear precoded signals, according to one embodiment of the disclosure.

In one embodiment of the disclosure, a decoder circuit associated with a receiver circuit is disclosed. The decoder circuit comprises a modulo estimation circuit configured to receive a non-linear pre-coded quadrature amplitude modulated (QAM) data symbol, having an unknown modulo shift associated therewith, wherein the received QAM data symbol is associated with a predetermined QAM constellation comprising a plurality of constellation points; and determine a modulo shift estimate associated with the received QAM data symbol, wherein the modulo shift estimate comprises a modulo shift that brings the received QAM symbol within the predetermined QAM constellation. The decoder circuit further comprises a QAM decoder circuit configured to map the received QAM data symbol to a winning constellation point, wherein the winning constellation point comprises a constellation point in an extended QAM constellation comprising a plurality of copies of the predetermined QAM constellation extending in one or more directions from the predetermined QAM constellation; and generate a quantized constellation point comprising a constellation point within the predetermined QAM constellation from the winning constellation point, based on applying the modulo shift corresponding to the modulo shift estimate to the winning constellation point.

In one embodiment of the disclosure, a receiver circuit in a communication system is disclosed. The receiver circuit comprises a decoder circuit comprising a modulo estimation circuit configured to receive a non-linear pre-coded quadrature amplitude modulated (QAM) data symbol, having an unknown modulo shift associated therewith, wherein the received QAM data symbol is associated with a predetermined QAM constellation comprising a plurality of constellation points; and determine a modulo shift estimate associated with the received QAM data symbol, wherein the modulo shift estimate comprises a modulo shift that brings the received QAM symbol within the predetermined QAM constellation. The decoder circuit further comprises a QAM decoder circuit configured to map the received QAM data symbol to a winning constellation point, wherein the winning constellation point comprises a constellation point in an extended QAM constellation comprising a plurality of copies of the predetermined QAM constellation extending in one or more directions from the predetermined QAM constellation; and generate a quantized constellation point comprising a constellation point within the predetermined QAM constellation from the winning constellation point, based on applying the modulo shift corresponding to the modulo shift estimate to the winning constellation point.

In one embodiment of the disclosure, a method for a decoder circuit associated with a receiver circuit in a communication system is disclosed. The method comprises receiving a non-linear pre-coded quadrature amplitude modulated (QAM) data symbol, having an unknown modulo shift associated therewith, at a modulo estimation circuit, wherein the received QAM data symbol is associated with a predetermined QAM constellation comprising a plurality of constellation points; and determining a modulo shift estimate associated with the received QAM data symbol, at the modulo estimation circuit, wherein the modulo shift estimate comprises a modulo shift that brings the received QAM symbol within the predetermined QAM constellation. The method further comprises mapping the received QAM data symbol to a winning constellation point, at a QAM decoder circuit, wherein the winning constellation point comprises a constellation point in an extended QAM constellation comprising a plurality of copies of the predetermined QAM constellation extending in one or more directions from the predetermined QAM constellation; and generating a quantized constellation point comprising a constellation point within the predetermined QAM constellation from the winning constellation point, based on applying the modulo shift corresponding to the modulo shift estimate to the winning constellation point, at the QAM decoder circuit.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuit" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

As indicated above, non-linear precoding of QAM data symbols lead to very complex pre-processing at the receiver. When the transmitted symbols are non-linear precoded, the received point at the receiver side embeds an unknown shift which is a result of the modulo operation performed at the transmitter. This shift is called as modulo shift in the rest of this document. The receiver needs only a modulo output and is not concerned with the modulo shift applied at the transmitter. In some embodiments, the modulo output is the remainder of a certain division operation. The remainder can take both positive and negative values and always lies within certain limits. These limits are specific to each predetermined QAM constellation. It shall be noted that the shift may be different for the real and imaginary parts of a symbol. Moreover, as the received symbol is always observed through noise, separating the received symbol into a modulo shift applied at the transmitter, a modulo output, and noise will lead to ambiguity. This is because the exact value of noise is not known to the receiver. Therefore, in such embodiments, some preprocessing is required at the receiver to separate the received symbol values into a modulo shift and a modulo output. Any non-linear precoded symbol can be stated mathematically as follows:

Symbol Value(real or imaginary part)=modulo shift+ modulo output where modulo shift and modulo output are associated, respectively, with the quotient and remainder of a certain division operation and are specific to each predetermined QAM constellation.

A modulo operation is just the process of extracting the modulo output (and discarding the modulo shift). In some embodiments, the received QAM symbols are associated with a predetermined QAM constellation comprising a plurality of constellation points. Due to the modulo shift applied at the transmitter, as well as due to noise, the received QAM symbol will be shifted from an exact constellation point associated with the predetermined QAM constellation. Therefore, in some embodiments, some pre-processing (e.g., a modulo operation) is required to be performed on the received symbol, in order to fold the received symbol back to an original constellation associated with the received QAM symbol. That is, in such embodiments, the received point (e.g., the received QAM symbol) is to be mapped to an exact constellation point in the predetermined constellation diagram associated with the received QAM symbol. In typical implementations of the decoders, the exact values of the modulo-shift and modulo output are known only after the decoder has found the originally transmitted constellation points correctly. This ambiguity ideally requires us to keep track of different possible shifts and use this information throughout the decoding process. This leads to an implementation that is memory intensive and complicates either a hardware or a software implementation.

For example, in conventional decoders (e.g., a Viterbi decoder) supporting modulo precoded signals the pre-processing involves determining a plurality of nearest constellation points (or cosets) relative to the received point in the predetermined QAM constellation associated with the received QAM symbol and determining a winning constellation point (or a winning coset) from the plurality of the nearest constellation points, based on a distance criteria. In some embodiments, the winning coset corresponds to an exact constellation point corresponding to the received QAM symbol on the predetermined QAM constellation. For non-linear precoded QAM symbols that has an unknown modulo shift associated with it, in order to determine the plurality of nearest constellation points in the predetermined QAM constellation associated with the received QAM symbol, a plurality of possible modulo shifts (e.g., shift left, shift right, no shift etc.) associated with the received point (i.e., the received QAM symbol) have to be identified, so that distances to each of the cosets are as small as possible.

The above approach has many disadvantages associated with it. For example,
- Pre-processing consists of a default modulo (while determining the plurality of nearest constellation points) followed by a second adjustment of the shift depending on the location of the received point. This has to be done based on some geometric considerations, is constellation specific, and is not computationally efficient.
- The procedure for identifying the nearest cosets (and the shifts) for non-square constellations (e.g, ITU G.9701 3-bit constellations) is more complex compared to the square constellations. For all the square and non-square constellations, received points has to be divided into a plurality of zones (based on the shift) and adapt the processing based on the received symbol.
- The pre-processing for 1-bit constellations is also very complex because of their special shapes.
- This approach needs additional memory to store the shifted received values for each coset.
- In a pipelined hardware implementation, this needs an additional processing stage, which increases delay in modulo processing. This also makes a generic hardware implementation that works for non-precoded (or linear precoded) and non-linear-precoded inputs difficult to implement.

Therefore, in order to overcome the disadvantages associated with the conventional decoders that support modulo precoded signals, an apparatus and a method for a decoder that decodes modulo precoded signals is proposed in this disclosure. The basic principle is to process the received symbol using extended constellation shapes. The proposed decoder works using extended constellations and produces decoded points (i.e., the winning constellation point) that will be outside the limits allowed for the predetermined QAM constellation associated with the received symbol. In some embodiments, the extended QAM constellations comprises a plurality of copies of the predetermined QAM constellation extending in one or more directions from the predetermined QAM constellation. Depending on the system requirements, in some embodiments, both the transmitter and the receiver agree on a maximum size of the extended QAM constellation.

In the proposed decoder, the modulo parameters (the modulo shift and modulo output) associated with the received QAM symbol are approximately estimated right in the beginning, before processing the received data and saved for later use. This operation requires different processing for different constellation types listed above. Once this processing is done, the proposed decoder finds the suitable (winning) QAM constellation point for the received QAM symbol in the extended constellation. A modulo operation is then performed on this winning constellation point to fold it back to the original constellation (i.e., the predetermined QAM constellation) using the saved modulo parameters. This folded back constellation point is finally used to extract the bits. In some embodiments, the proposed invention eliminates the task of computing all possible modulo shifts (in order to find the nearest cosets within the predetermined QAM constellation in the conventional approach) and the decoding takes place without this information.

FIG. 1a illustrates a simplified block diagram of an exemplary communication system 100 that supports modulo precoded signals or non-linear precoded signals, according to one embodiment of the disclosure. In the embodiments described herein, the term "modulo precoded" and "non-linear precoded" are used interchangeably and have the same meaning. In some embodiments, the communication system 100 comprises a wireline system. However, other kinds of communication systems are also contemplated to be within the scope of this disclosure. The communication system 100 comprises a transmitter circuit 102 configured to transmit a modulo precoded transmit signal 103 and a receiver circuit 104 configured to receive a modulo precoded receive signal 105. In some embodiments, the modulo precoded receive signal 105 at the receiver circuit 104 is a noisy version of the modulo precoded transmit signal 103 from the transmitter circuit 102. The receiver circuit 104 further comprises a decoder circuit 106 configured to decode one or more non-linear precoded QAM data symbols 105a associated with the modulo precoded receive signal 105. In some embodiments, the non-linear precoded QAM receive signal 105 or the QAM data symbols 105a associated therewith can be encoded using trellis coded modulation (TCM). However, codes other than TCM are also contemplated to be within the scope of this disclosure.

In some embodiments, the non-linear precoded QAM data symbols 105a has an unknown modulo shift associated therewith. In some embodiments, the unknown modulo shift is associated with a modulo shift applied to a transmitted QAM symbol (associated with the modulo precoded transmit signal 103) at the transmitter 102 as well as noise. In some embodiments, the one or more received QAM data symbols 105a are respectively associated with a predetermined QAM constellation comprising a plurality of constellation points associated therewith. In some embodiments, the predetermined QAM constellation associated with the one or more received QAM data symbols 105a can be of different constellation sizes (3-bit, 5-bit etc.), types or shapes, for example, square QAM constellation (SQC), non-square QAM constellation (NSQC), diamond QAM constellations (DDC), and 1-Bit QAM constellations (B1C) (i.e., the constellations defined in the ITU G.9701 standard).

Figure 2A:
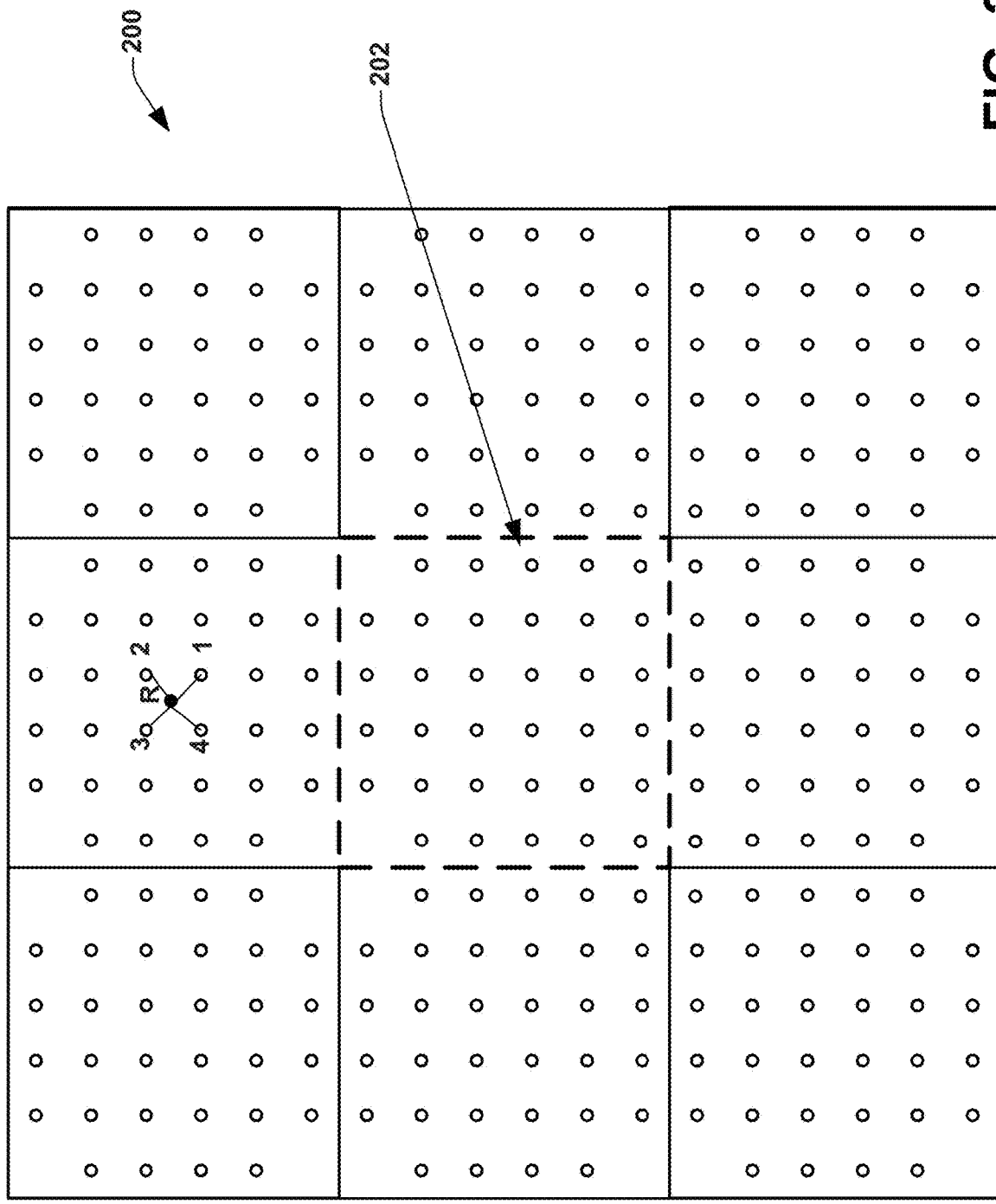
FIG. 2a shows an example of extended 5-bit non-square QAM constellation (NSQC), according to one embodiment of the disclosure.
Figure 2B:
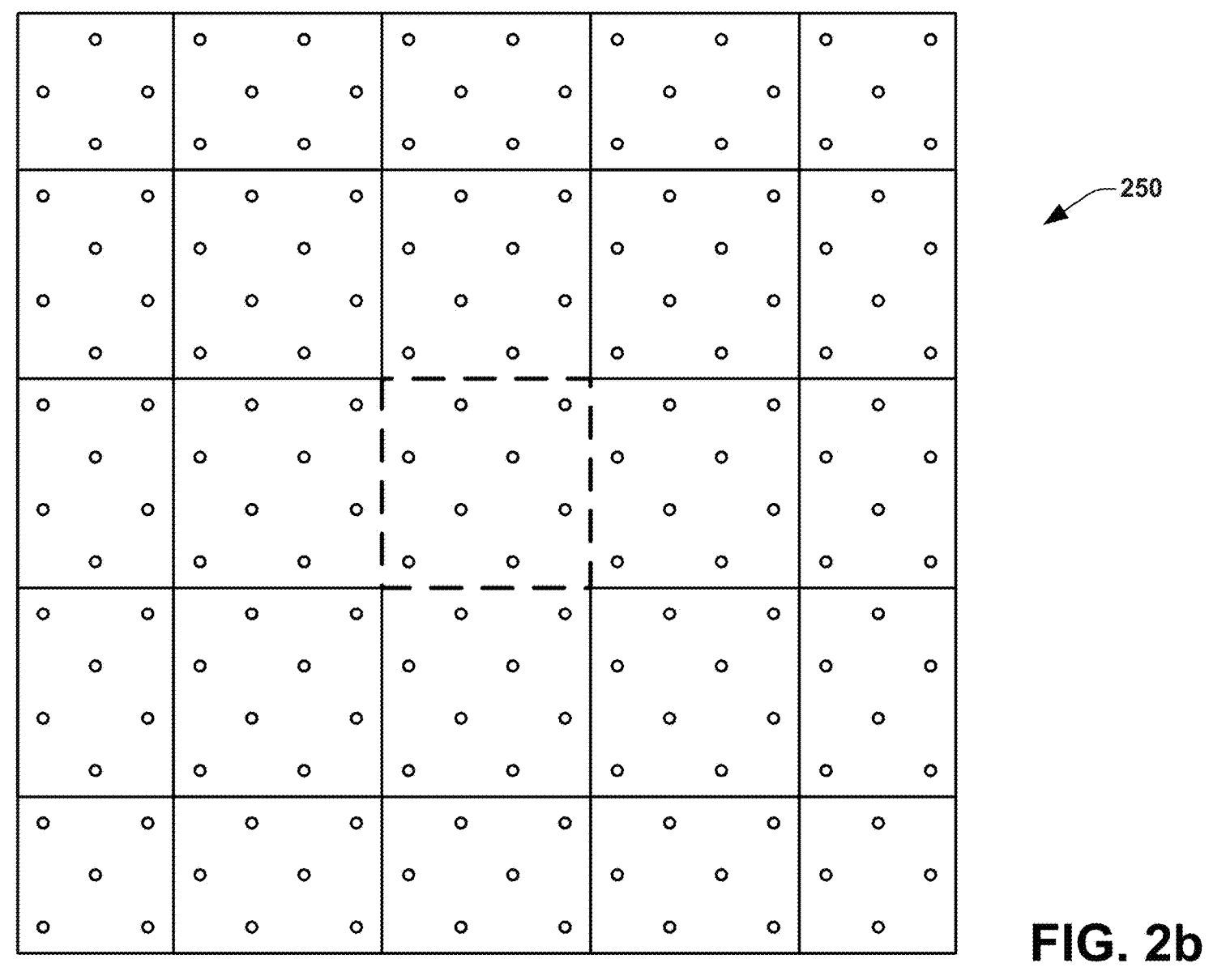

In some embodiments, the received non-linear precoded QAM data symbol 105a is assumed to be associated with an extended QAM constellation comprising a plurality of copies of the predetermined QAM constellation extending in one or more directions from the predetermined QAM constellation, as shown in FIG. 2a and FIG. 2b. FIG. 2a shows an example of extended 5-bit NSQC and FIG. 2b shows an example of extended 3-bit DDC. In FIG. 2, the constellation 202 depicts the predetermined QAM constellation (i.e., the original constellation) and the constellation 200 depicts the extended constellation. In some embodiments, the one or more received QAM data symbols 105a associated with the modulo precoded receive signal 105 are decoded at the decoder circuit 106 based on mapping the one or more received QAM data symbols 105a to constellation points within the respective extended QAM constellation, the details of which are given in the embodiments below.

In some embodiments, the receiver circuit 104 further comprises a maximum extended constellation size memory circuit 108 configured to store information on a maximum allowable size of the extended QAM constellation supported by the receiver circuit 104. In some embodiments, the maximum allowable size of the extended QAM constellation is determined at the receiver circuit 104, however, in other embodiments, the maximum allowable size of the extended QAM constellation can be determined outside the receiver circuit 106 and stored within the maximum extended constellation size memory circuit 108, prior to receiving the modulo precoded receive signal 105 at the receiver circuit 104. In some embodiments, the maximum extended constellation size memory circuit 108 can be included as part of the decoder circuit 106. However, in other embodiments, the maximum extended constellation size memory circuit 108 can be different from the decoder circuit 106 and may be coupled to the decoder circuit 106. In some embodiments, the maximum allowable size of the extended constellation is decided based on the allowable cross talk level at the receiver circuit 104. In some embodiments, the maximum allowable size of the extended constellation may be different for different QAM constellation types (for example, SQC, NSQC, DDC, B1C etc.). However, in other embodiments, the maximum allowable size of the extended constellation for the different QAM constellation types can be the same.

In some embodiments, the receiver circuit 104 further comprises a receive processing circuit 110 configured to provide the information on the maximum size of the extended QAM constellation stored in the maximum extended constellation size memory circuit 108 to the transmitter circuit 102, prior to receiving the modulo precoded receive signal 105 at the receiver circuit 104. In some embodiments, the receive processing circuit 110 can be configured to communicate via 111 the information regarding the maximum allowable size of the extended QAM constellation stored within the maximum extended constellation size memory circuit 108 to the transmitter circuit 102, prior to receiving the modulo precoded receive signal 105 at the receiver circuit 104. However, in other embodiments, the transmitter circuit 102 can be configured to receive information on the maximum allowable size of the extended QAM constellation differently, for example, predetermined and stored within a memory circuit (not shown) associated with the transmitter circuit 104. In some embodiments, it is assumed that both the transmitter circuit 102 and the receiver circuit 104 are aware of the maximum allowable size of the extended QAM constellation supported by the receiver circuit 104, prior to the communication of non-linear precoded signals between them.

Figure 1B:
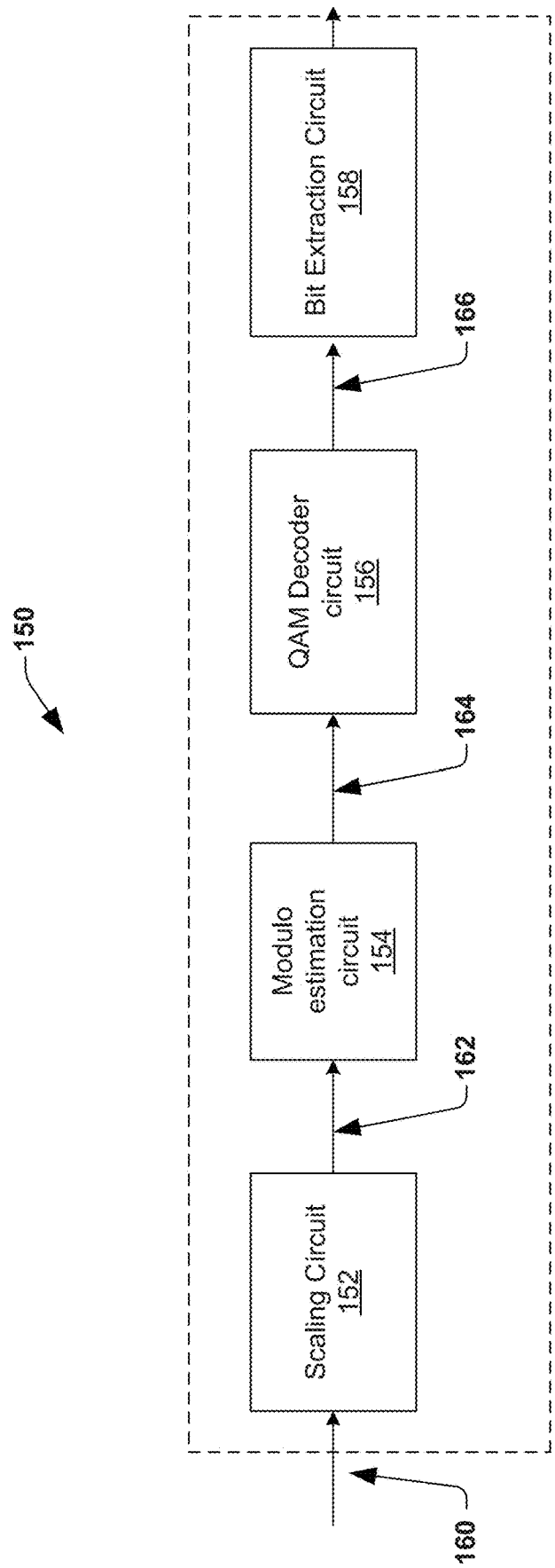
FIG. 1b illustrates a simplified block diagram of an exemplary decoder circuit that supports modulo precoded signals, according to one embodiment of the disclosure.

FIG. 1b illustrates a simplified block diagram of an exemplary decoder circuit 150 that supports modulo precoded signals, according to one embodiment of the disclosure. In some embodiments, the decoder circuit 150 is associated with a receiver circuit in communication system, for example, a wireline system. However, in other embodiments, the decoder circuit 150 can be associated with receiver circuits in other types of communication systems. In some embodiments, the decoder circuit 150 is an extension of a Viterbi decoder. In some embodiments, the decoder circuit 150 can be included within the decoder circuit 106 within the communication system 100 in FIG. 1a explained above. In some embodiments, the decoder circuit 150 is configured to decode a modulo precoded receive signal (e.g., the modulo precoded receive signal 105 in FIG. 1a) received at the decoder circuit 150 from a transmitter circuit (e.g., the transmitter circuit 102 in FIG. 1a) associated with the communication system. In some embodiments, the modulo precoded receive signal is a noisy version of a modulo precoded transmit signal (e.g., the modulo precoded transmit signal 103 in FIG. 1a) transmitted by the transmitter circuit. In some embodiments, the decoder circuit 150 is configured to decode one or more non-linear precoded QAM data symbols 160 associated with the modulo precoded receive signal. In some embodiments, the modulo precoded signal or the non-linear precoded QAM data symbols 160 can be encoded using trellis coded modulation (TCM). However, codes other than TCM are also contemplated to be within the scope of this disclosure.

The decoder circuit 150 comprises a scaling circuit 152, a modulo estimation circuit 154, a QAM decoder circuit 156 and a bit extraction circuit 158. In some embodiments, the scaling circuit 152 is configured to receive the one or more non-linear precoded QAM data symbols 160, associated with a modulo precoded receive signal. In this embodiment, for ease of explanation, the scaling circuit 102 is shown to receive and process a single non-linear precoded QAM data symbol 160. However, in other embodiments, the scaling circuit 152 can be configured to receive a plurality of non-linear precoded QAM data symbols, associated with the modulo precoded receive signal. In some embodiments, the plurality of non-linear precoded QAM data symbols can be processed at the scaling circuit 152 (or the decoder circuit 150) individually, or in pairs or in multiple numbers as per the system requirements. In some embodiments, the non-linear precoding of the QAM data symbol 160 is due to a modulo operation performed by the transmitter circuit (not shown) on the QAM data symbol 160.

In some embodiments, the non-linear precoded QAM data symbol 160 has an unknown modulo shift associated therewith. In some embodiments, the unknown modulo shift of the non-linear precoded QAM data symbol 160 is associated with a modulo shift applied to a transmitted QAM symbol (not shown) associated with the modulo precoded transmit signal at the transmitter side as well as noise. In some embodiments, the non-linear precoded QAM symbol 160 corresponds to a noisy version of the transmitted QAM symbol. In some embodiments, the received non-linear precoded QAM data symbol 160 has a predetermined QAM constellation comprising a plurality of constellation points associated therewith. In some embodiments, the predetermined QAM constellation can be of different constellation sizes (3-bit, 5-bit etc.), types or shapes, for example, square QAM constellation (SQC), non-square QAM constellation (NSQC), diamond QAM constellations (DDC), and 1-Bit QAM constellations (B1C) (i.e., the constellations defined in the ITU G.9701 standard). In some embodiments, the received non-linear precoded QAM data symbol 160 is assumed to be associated with an extended QAM constellation comprising a plurality of copies of the predetermined QAM constellation extending in one or more directions from the predetermined QAM constellation, as shown in FIG. 2a and FIG. 2b. FIG. 2a shows an example of extended 5-bit NSQC and FIG. 2b shows an example of extended 3-bit DDC. In FIG. 2a, the constellation 202 depicts the predetermined QAM constellation (i.e., the original constellation) and the constellation 200 depicts the extended constellation.

Upon receiving the non-linear precoded QAM data symbol 160 at the scaling circuit 152, the scaling circuit 152 is configured to scale the non-linear precoded QAM data symbol 160 and map the non-linear precoded QAM data symbol 160 to a known reference constellation grid, thereby generating a scaled QAM data symbol 162. In some embodiments, the scaling circuit 152 allows to map the non-linear precoded QAM data symbol 160 or other QAM constellation points belonging to any type of constellation (SQC, NSQC, DDC, B1C) to points on this reference constellation grid, so that the non-linear precoded QAM data symbol 160 can be easily quantized and processed. In some embodiments, information on the reference constellation grid (type, size etc.) is predetermined. The modulo estimation circuit 154 is coupled to the scaling circuit 152 and is configured to receive the scaled QAM data symbol 162. The modulo estimation circuit 154 is further configured to determine modulo parameters comprising a modulo shift estimate and a modulo output associated with the received QAM data symbol 160 (or the scaled QAM data symbol 162), based on the predetermined QAM constellation associated with the received QAM data symbol 160. In some embodiments, the modulo shift estimate determined at the modulo estimation circuit 154 is indicative of an estimate of the unknown modulo shift associated with the received QAM data symbol 160. In some embodiments, the modulo shift estimate determined at the modulo estimation circuit 154 corresponds to a modulo shift required to bring the received point (i.e., the received QAM data symbol 160) within the predetermined QAM constellation associated with the received QAM data symbol 160. In some embodiments, the modulo shift estimate is determined at the modulo estimation circuit 154 based on the information of the received QAM data symbol 160 and the predetermined QAM constellation (e.g., the constellation size) associated with it. In some embodiments, the determined modulo parameters are stored in a modulo parameter memory (not shown) associated with the modulo estimation circuit 154.

In some embodiments, the modulo estimation circuit 154 is further configured to clip the scaled QAM data symbol 162 so that wrong or missing points are not found at the time of quantization (which is the next stage), based on a predefined extended QAM constellation size (e.g., the maximum allowable extended constellation size as explained above in FIG. 1a). In some embodiments, it is assumed that both the transmitter circuit and the receiver circuit are aware of the allowable extended constellation size, prior to receiving the non-linear precoded QAM data symbol 160 at the receiver circuit. In some embodiments, the size of the extended constellation is stored in a memory associated with the decoder circuit 150 or the receiver circuit associated therewith. Clipping inherently limits the modulo repetitions in a constellation dependent manner. In some embodiments, the modulo estimation circuit 154 clips the maximum symbol level in such a way as to allow for more modulo repetitions (or large amount of crosstalk) for smaller constellations and less repetitions for the higher constellations.

In some embodiments, the clipping levels for clipping the scaled QAM data symbol 162 can be controlled by the user based on the predefined maximum allowable size of the extended constellation, and are made available in a clipping parameter memory (not shown) associated with the modulo estimation circuit 154. Clipping applied at the modulo estimation circuit 154 is common to all constellations. In addition, for non-square constellations (NSQC), an additional clipping is also performed to prevent the received points from lying in the corner regions of the NSQC. In some embodiments, this additional clipping would insure that the received point (i.e., the scaled QAM data symbol 162 or the QAM data symbol 160) does not quantize to points (or cosets) that are missing in the corner regions or their copies (in the extended space). In some embodiments, the output of the modulo estimation circuit 154 comprises a clipped QAM data symbol 164, which is a clipped version of the scaled QAM data symbol 162. However, in some embodiments, the scaled QAM data symbol 162 may not be clipped within the modulo estimation circuit 154. That is, in such embodiments, the clipped QAM data symbol 164 may be an unclipped version of the scaled QAM data symbol 162. In such embodiments, the clipped QAM data symbol 164 and the scaled QAM data symbol 162 can be the same.

The QAM decoder circuit 156 is coupled to the modulo estimation circuit 154 and is configured to receive the clipped QAM data symbol 164. In some embodiments, the QAM decoder circuit 156 is further configured to map the received QAM data symbol 154 to a constellation point (e.g., a winning constellation point) in the extended QAM constellation (e.g., the extended constellation 200 or 250 in FIG. 2a and FIG. 2b) associated with the predetermined QAM constellation, the details of which are given in an embodiment below. In some embodiments, the QAM decoder circuit 156 is further configured to perform a modulo operation on the winning constellation point, based on the modulo parameter (e.g, the modulo shift estimate) determined at the modulo estimation circuit 154, in order to generate a quantized constellation point 166 comprising a constellation point within the predetermined QAM constellation. In some embodiments, the determined modulo shift estimate needs to be adjusted further, in order to fold back the winning constellation point to the predetermined QAM constellation. In some embodiments, the modulo operation performed at the QAM decoder circuit 156 enables to fold back the winning constellation point from the extended QAM constellation into the original or the predetermined QAM constellation associated with the received QAM data symbol 160. In some embodiments, the quantized constellation point 166 corresponds to the transmitted QAM symbol transmitted from the transmitter side. The bit extraction circuit 158 is coupled to the QAM decoder circuit 156 and is configured to receive the quantized constellation point 166. In some embodiments, the bit extraction circuit 158 is further configured to convert the quantized constellation point to bits.

In some embodiments, the winning constellation point in the extended QAM constellation is determined at the QAM decoder circuit 156 by finding a plurality of nearest cosets or constellation points (typically 4 nearest constellation points, in some embodiments) of the received point (i.e., the clipped QAM data symbol 164) in the extended constellation space. For example, referring to FIG. 2a again, if point R corresponds to the received QAM data symbol 160 (or the clipped QAM data symbol 164), then the plurality of nearest cosets can include the constellation points 1, 2, 3 and 4. As can be noted herein, in conventional decoders, however, the plurality of nearest cosets were determined within the original or the predetermined QAM constellation as opposed to the cosets (e.g., the cosets 1, 2, 3 and 4 in FIG. 2a) in the extended QAM constellation in the decoder circuit 150. Upon finding the plurality of nearest cosets, the QAM decoder circuit 156 is further configured to determine a plurality of constellation distances comprising respective distances between the clipped (or un-clipped) QAM symbol 164 (i.e., the received point R) and the plurality of nearest cosets (i.e., the cosets 1, 2, 3 and 4 in FIG. 2a), in the extended QAM constellation. Upon finding the plurality of constellation distances, the QAM decoder circuit 156 is further configured to determine a winning coset or the winning constellation point, from the plurality of nearest cosets (i.e., the cosets 1, 2, 3 and 4 in FIG. 2a), based on the constellation distances, in accordance with a predetermined distance criteria. In some embodiments, the predetermined distance criteria comprise a minimum distance criteria. However, in other embodiments, other distance criteria different from the minimum distance criteria can also be utilized.

Figure 3:
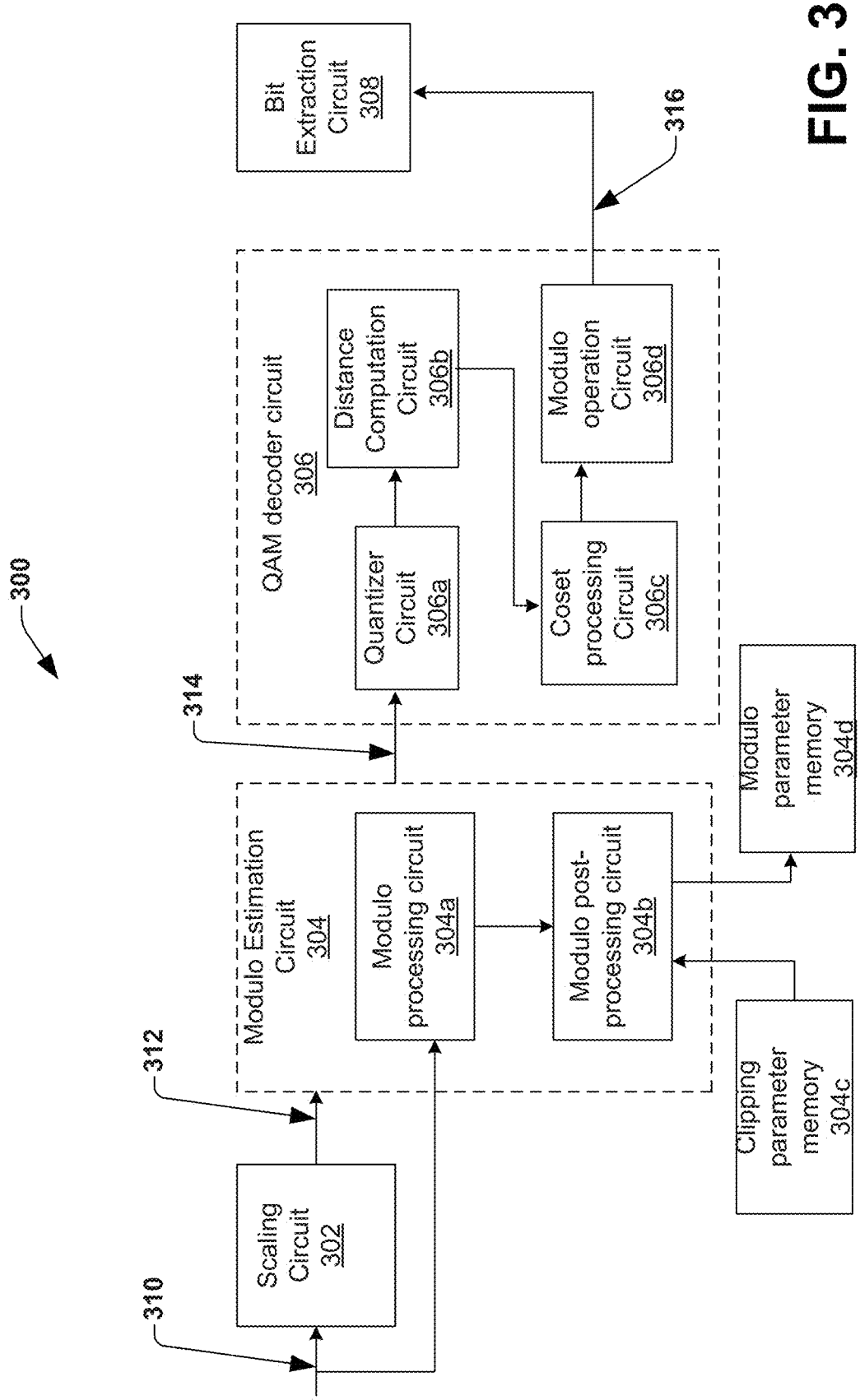
FIG. 3 illustrates a detailed block diagram of a decoder circuit that supports modulo precoded signals, according to one embodiment of the disclosure.

FIG. 3 illustrates a detailed block diagram of a decoder circuit 300 that supports modulo precoded signals, according to one embodiment of the disclosure. In some embodiments, the decoder circuit 300 illustrates one possible way of implementation of the decoder circuit 150 in FIG. 1b. In some embodiments, the decoder circuit 300 is associated with a receiver circuit in communication system, for example, a wireline system. In some embodiments, the decoder circuit 300 can be included within the decoder circuit 106 in FIG. 1a. The decoder circuit 300 comprises a scaling circuit 302, a modulo estimation circuit 304, a QAM decoder circuit 306 and a bit extraction circuit 308.

The scaling circuit 302 is configured to receive a non-linear precoded QAM data symbol 310. In some embodiments, the non-linear precoded QAM data symbol 310 can be encoded using trellis coded modulation (TCM). In some embodiments, the non-linear precoded QAM data symbol 310 in FIG. 3 is same as the non-linear precoded QAM symbol 160 in FIG. 1b above. In some embodiments, the non-linear precoded QAM data symbol 310 has an unknown modulo shift associated therewith. In some embodiments, the unknown modulo shift is associated with a modulo shift applied to a transmitted QAM symbol (not shown) at a transmitter circuit associated with the communication system. In some embodiments, the non-linear precoded QAM symbol 310 corresponds to a noisy version of the transmitted QAM symbol. In some embodiments, the received non-linear precoded QAM data symbol 310 has a predetermined QAM constellation comprising a plurality of constellation points associated therewith. Further, in some embodiments, the received non-linear precoded QAM data symbol 310 is assumed to be associated with an extended QAM constellation comprising a plurality of copies of the predetermined QAM constellation extending in one or more directions from the predetermined QAM constellation, as shown in FIG. 2a and FIG. 2b. Upon receiving the non-linear precoded QAM data symbol 310, the scaling circuit 302 is configured to scale the QAM data symbol 310 and map the QAM data symbol 310 to a known reference constellation grid, thereby generating a scaled QAM data symbol 312.

The modulo estimation circuit 304 is coupled to the scaling circuit 302 and is configured to receive the scaled QAM data symbol 312. As indicated above, any received QAM symbol comprises a modulo shift and a modulo output associated therewith corresponding to a quotient and a remainder, respectively, of a certain division operation and are specific to each predetermined QAM constellation and the modulo estimation circuit 304 is configured to determine the modulo output and the modulo shift associated with the scaled QAM data symbol 312. In some embodiments, the modulo estimation circuit 304 comprises a modulo processing circuit 304a configured to receive the scaled QAM data symbol 312 or the received QAM data symbol 310, and determine the modulo output associated with the scaled QAM data symbol 312 or the received QAM data symbol 310. In some embodiments, the modulo processing circuit 304a operates in parallel with the scaling circuit 302. Further, in some embodiments, the modulo estimation circuit 304 comprises a modulo post-processing circuit 304b configured to determine a modulo shift estimate comprising the modulo shift associated with the scaled QAM data symbol 312 or the received QAM data symbol 310. In some embodiments, the modulo shift estimate determined at the modulo post-processing circuit 304b corresponds to a modulo shift required to bring the received point (i.e., the received QAM data symbol 310) within the predetermined QAM constellation associated with the received QAM data symbol 310.

In some embodiments, the modulo shift estimate determined at the modulo estimation circuit 104 is indicative of an estimate of the unknown modulo shift associated with the received QAM data symbol 110. In some embodiments, modulo parameters comprising the modulo shift estimate and the modulo output are stored in the modulo parameter memory 304d. Alternatively, in other embodiments, the modulo estimation circuit 304 can be implemented differently. In some embodiments, the modulo post-processing circuit 304b is further configured to clip the scaled QAM data symbol 312 based on clipping levels stored in the clipping parameter memory circuit 304c. In some embodiments, the clipping levels are defined by a maximum allowable size of the extended QAM constellation. In some embodiments, it is assumed that both the transmitter circuit and the receiver circuit are aware of the allowable extended constellation size, prior to receiving the non-linear precoded QAM data symbol 310 at the receiver circuit. In some embodiments, the output of the modulo estimation circuit 304 comprises a clipped QAM data symbol 314. However, in other embodiments, the output of the modulo estimation circuit 304 can comprise an unclipped version of the clipped QAM data symbol 314.

Figure 4B:
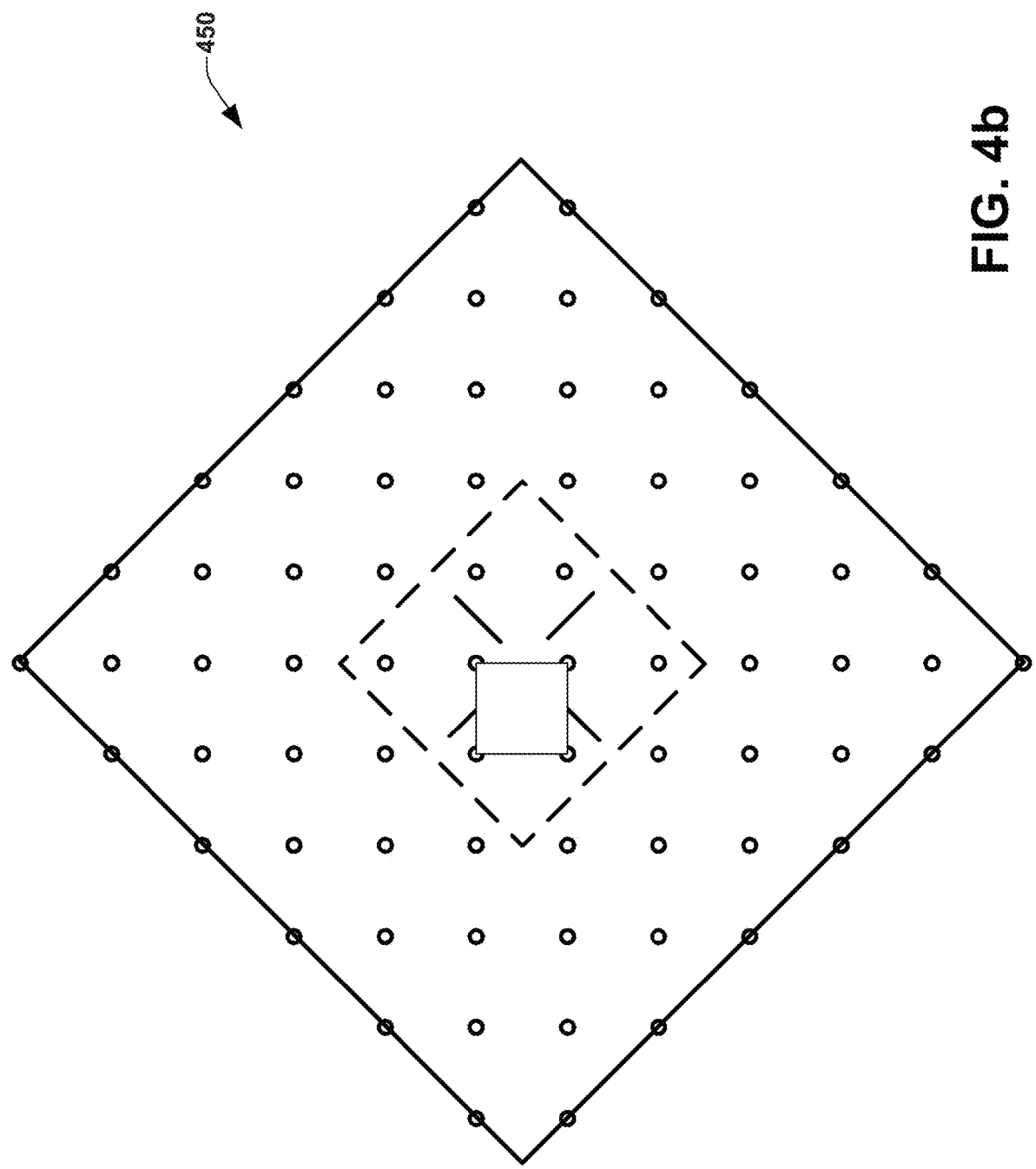
Figure 5:
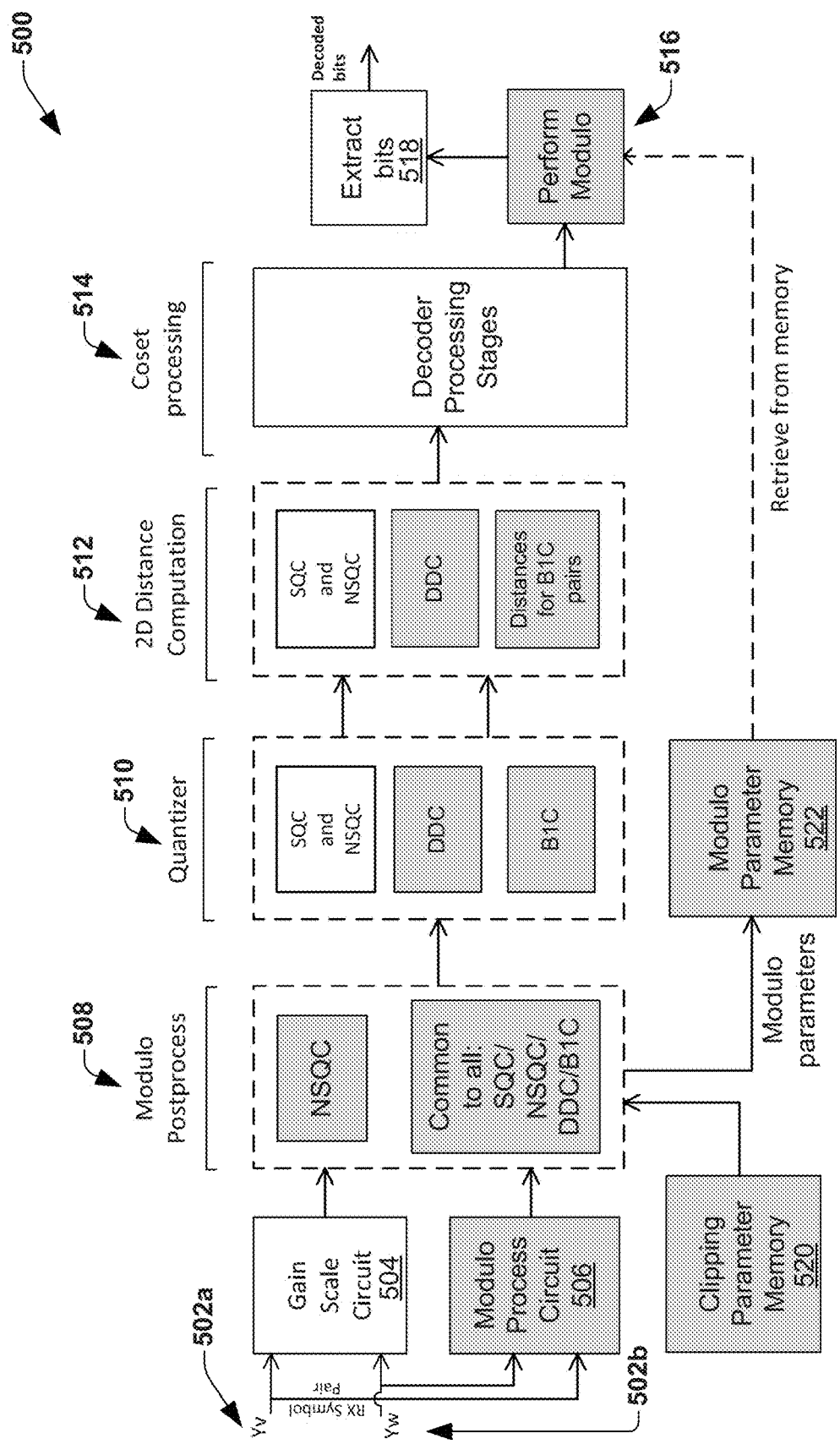
FIG. 5 depicts an example implementation of the decoder circuit that supports modulo precoded signals, according to one embodiment of the disclosure.

The QAM decoder circuit 306 is coupled to the modulo estimation circuit 304 and comprises a quantizer circuit 306a configured to receive the clipped (or unclipped) QAM data symbol 314 and determine a plurality of nearest cosets or constellation points (typically 4 nearest constellation points, in some embodiments) of the received point (i.e., the clipped QAM data symbol 314) in the extended constellation space associated with the clipped QAM data symbol 314, as explained above with respect to FIG. 2a. For square- and non-square-constellations, the quantizer circuit 306a is configured to determine the plurality of nearest cosets based on the original received point. However, for diamond shaped constellations, the quantizer circuit 306a is configured to rotate the received point by 45 degrees and the plurality of nearest cosets are determined based on the rotated received point, to form a plurality of rotated cosets. FIG. 4a and FIG. 4b shows examples of an original 3-bit diamond constellation and a rotated 3-bit diamond constellation, respectively. Further, for 1-Bit constellations, the quantizer circuit 306a is configured to determine only 2 nearest cosets (i.e., the plurality of nearest cosets comprises 2 nearest cosets). In some embodiments, the quantizer circuit 306a can comprise one or more circuits associated therewith, in order to handle specific constellation types (as shown in FIG. 5 below).

The QAM decoder circuit 306 further comprises a distance computation circuit 306b configured to determine a plurality of constellation distances comprising respective distances between the clipped QAM symbol 314 and the plurality of nearest cosets in the extended QAM constellation. In some embodiments, unclipped QAM symbols as well can be used for distance computation. For square- and non-square-constellations, the distance computation circuit 306b is configured to determine the constellation distances based on the original received point. However, for diamond shaped constellations, the distance computation circuit 306b is configured to determine the constellation distances based on the rotated received point and the plurality of rotated cosets received from the quantizer circuit 306a. Further, for 1-Bit constellations, the distance computation circuit 306b is configured to determine distances from a pair of 1-bit symbols to obtain the constellation distance. For example, the plurality of constellation distances comprises two-bit constellation distances determined based on individual distances for the pair of 1-bit symbols. In some embodiments, the distance computation circuit 306b can comprise one or more circuits associated therewith, in order to handle specific constellation types (as shown in FIG. 5 below).

The QAM decoder circuit 306 further comprises a coset processing circuit 306c configured to determine a winning coset or a winning constellation point, from the plurality of nearest cosets, based on the constellation distances, in accordance with a predetermined distance criteria. In some embodiments, the winning coset comprises a constellation point within the extended QAM constellation. In some embodiments, the QAM decoder circuit 306 further comprises a modulo operation circuit 306d configured to perform a modulo operation on the winning constellation point, based on the determined modulo shift estimate at the modulo estimation circuit 304 (or stored in the modulo parameter memory 304d), in order to generate a quantized constellation point 316 comprising a constellation point within the predetermined QAM constellation (or the original constellation). In some embodiments, performing the modulo operation on the winning constellation point enables to apply a modulo shift corresponding to the determined modulo shift estimate on the winning constellation point, so as to bring the winning constellation point within the predetermined QAM constellation.

The bit extraction circuit 308 is coupled to the QAM decoder circuit 306 and is configured to receive the quantized constellation point 316. In some embodiments, the bit extraction circuit 308 is further configured to convert the quantized constellation point 316 to bits. The bit extraction circuit 308 produces as many bits as the size of the constellation corresponding to the input symbol (i.e., the QAM symbol 310). The only exception is 1-Bit pairs, in which case the output of bit extraction circuit 308 produces 2-bits (corresponding to two 1-bit symbols).

FIG. 5 depicts an example implementation of the decoder circuit 500 that supports modulo precoded signals, according to one embodiment of the disclosure. The decoder circuit 500 depicts a possible way of implementation of the decoder circuit 300 in FIG. 3. However, other implementations of the decoder circuit 300 is also contemplated to be within the scope of this disclosure. In some embodiments, the various blocks associated with the decoder circuit 500 can be mapped to the blocks associated with the decoder circuit 300 in FIG. 3. For the decoder circuit 500, the processing of received data takes place on a pair of received QAM symbols Yv 502a and Yw 502b, respectively, at a time instance. However, in other embodiments, the processing of the received data can take place differently (i.e., individually or more numbers). Each pair of received symbols is a noisy point in the complex plane (i.e., each contains a real and imaginary part). In some embodiments, for example, in case of symbols belonging to 1-bit constellations, the received QAM symbols are processed in pairs. In such embodiments, each Yv 502a or Yw 502b can comprise two 1-bit symbols each. For example, if Yv 502a corresponds to a 1-bit symbol, then it refers to a pair of symbols (not just one 1-bit symbol). The same applies to Yw 502b.

The decoder circuit 500 comprises a gain scale circuit 504 configured to receive the pair of received QAM symbols Yv 502a and Yw 502b. In some embodiments, the gain scale circuit can be mapped to the scaling circuit 302 in FIG. 3 above and is configured to scale the received QAM symbols Yv 502a and Yw 502b, and map the QAM symbols Yv 502a and Yw 502b to a known reference constellation grid, thereby generating scaled QAM symbols. The decoder circuit 500 further comprises a modulo processing circuit 506 configured to determine a modulo output and a modulo post processing circuit 508 configured to determine a modulo shift estimate (also clip the scaled QAM symbols, in some embodiments) associated with the scaled QAM symbols, as explained above with respect to FIG. 3. In some embodiments, the modulo processing circuit 506 can be mapped to the modulo processing circuit 304a in FIG. 3 above and the modulo post processing circuit 508 can be mapped to the modulo post processing circuit 304b in FIG. 3 above. In some embodiments, the modulo post processing circuit 508 can comprise one or more components for implementing the various functions described above with respect to FIG. 3. For example, in this embodiment, a separate circuit, NSQC is utilized for processing QAM symbols with non-square QAM constellations and another circuit (or component) common for all other constellations. However, in other embodiments, the modulo post processing circuit 508 can be implemented differently.

The decoder circuit 500 further comprises a clipping parameter memory 520 and a modulo parameter memory 522. In some embodiments, the clipping parameter memory 520 can be mapped to the clipping parameter memory 304c in FIG. 3 and the modulo parameter memory 522 can be mapped to the modulo parameter memory 304d in FIG. 3 above. The decoder circuit 500 further comprises a quantizer circuit 510 configured to receive the clipped (or unclipped) QAM symbols at the output of the modulo post processing circuit 508 and determine a plurality of nearest cosets or constellation points (typically 4 nearest constellation points, in some embodiments) of the received point in an extended constellation space, as explained above with respect to FIG. 3. In some embodiments, the quantizer circuit 510 can be mapped to the quantizer circuit 306a in FIG. 3 above. In some embodiments, the quantizer circuit 510 can comprise separate circuits or components, for example, SQC and NSQC, DDC and B1C configured to process received QAM symbols belonging to the respective QAM constellations. However, in other embodiments, the quantizer circuit 510 can be implemented differently. In some embodiments, the received QAM symbols belonging to different QAM constellations are processed differently in the quantizer circuit 510, as explained above with respect to FIG. 3 above.

The decoder circuit 500 further comprises a 2D distance computation circuit 512 configured to determine a plurality of constellation distances associated with the plurality of nearest cosets. In some embodiments, the 2D distance computation circuit 512 can be mapped to the distance computation circuit 306b in FIG. 3. In some embodiments, the 2D distance computation circuit 512 can comprise separate circuits or components, for example, SQC and NSQC, DDC and B1C configured to process received QAM symbols belonging to the respective QAM constellations. However, in other embodiments, the 2D distance computation circuit 512 can be implemented differently. The decoder circuit 500 further comprises a coset processing circuit 514 configured to determine a winning coset or a winning constellation point, from the plurality of nearest cosets, based on the constellation distances, in accordance with a predetermined distance criteria, as explained above with respect to FIG. 3. In some embodiments, the coset processing circuit 514 can be mapped to the coset processing circuit 306c in FIG. 3. In some embodiments, the coset processing circuit 514 may also be configured to perform other processing steps associated with the decoder circuit 500 (for example, a Viterbi decoder processing steps).

The decoder circuit 500 further comprises a perform modulo circuit 516 configured to perform a modulo operation on the winning constellation point, based on the determined modulo shift estimate at the modulo post processing circuit 508 (or stored in the modulo parameter memory 522), in order to generate a quantized constellation point, as explained above with respect to FIG. 3. In some embodiments, the perform modulo circuit 516 can be mapped to the modulo operation circuit 306d in FIG. 3 above. In some embodiments, the decoder circuit 500 further comprises an extract bits circuit 518 configured to convert the quantized constellation point to bits. In some embodiments, the extract bits circuit 518 can be mapped to the bit extraction circuit 308 in FIG. 3 above.

Figure 6:
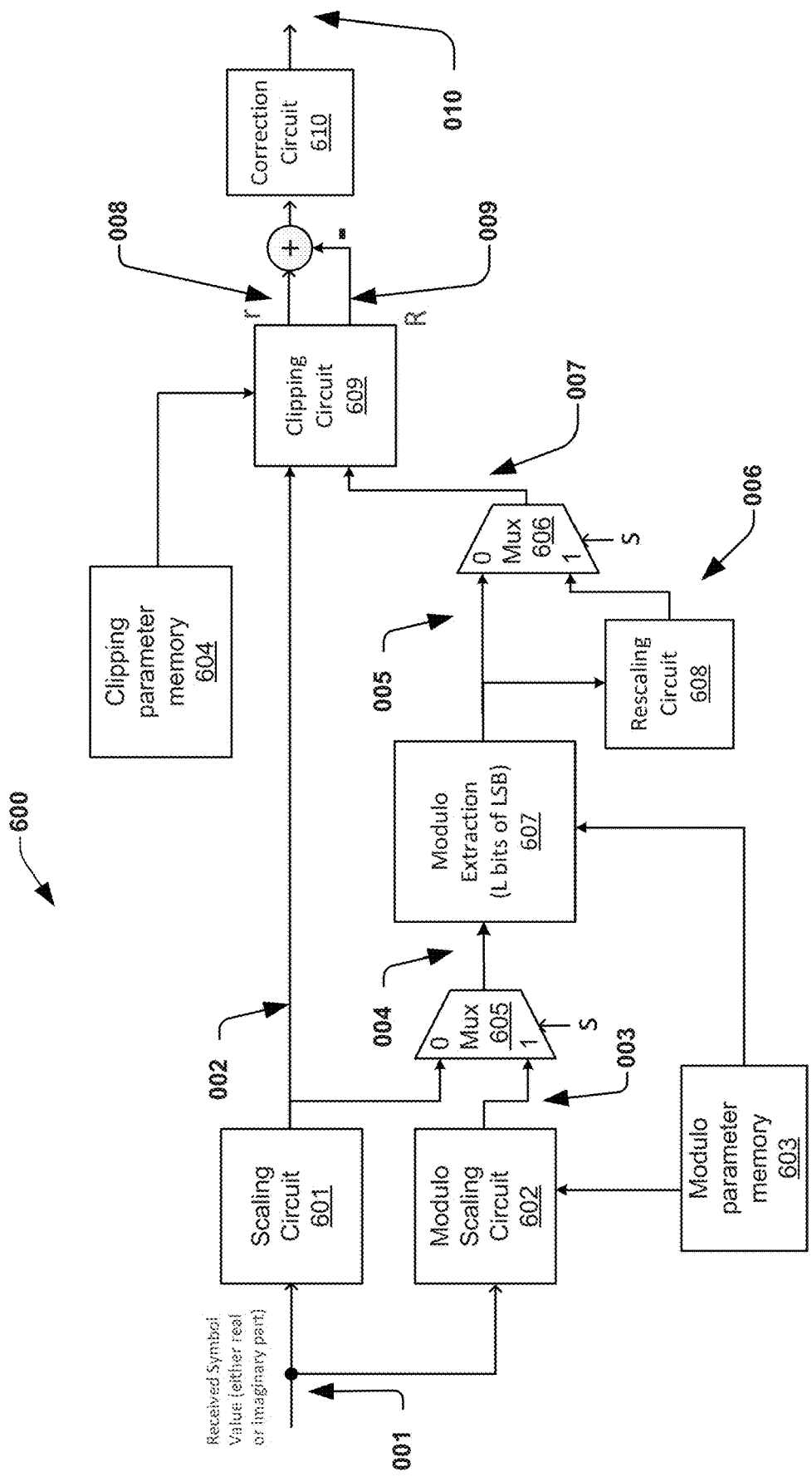
FIG. 6 illustrates an example implementation of a modulo estimation circuit, according to one embodiment of the disclosure.

FIG. 6 illustrates an example implementation of a modulo estimation circuit 600, according to one embodiment of the disclosure. In some embodiments, the modulo estimation circuit 600 depicts one possible way of implementation of the modulo estimation circuit 154 in FIG. 1b in hardware, in order to determine the modulo output and the modulo shift estimate, as explained above with respect to FIG. 1b. Other implementations of the modulo estimation circuit 154 is also contemplated to be within the scope of this disclosure. An input QAM symbol value 001 (either real or imaginary part) is received at a scaling circuit 601 which brings the received QAM value 001 to a known QAM constellation grid thereby forming a scaled QAM symbol 002. In case of non-square QAM constellation (NSQC), the input QAM symbol value 001 is also optionally connected to a modulo scaling circuit 602 which applies a different gain value in order to simplify modulo output computation thereby forming a scaled QAM symbol 003. In some embodiments, the scaling circuit 601 and the modulo scaling circuit 602 are part of the modulo estimation circuit 154. However, in other embodiments, the scaling circuit 601 and the modulo scaling circuit 602 may be different (or separate) from the modulo estimation circuit 154.

A Mux circuit 605 is coupled to the scaling circuit 601 and the modulo scaling circuit 602 and is configured to receive the scaled symbols 002 and 003. The Mux circuit 605 is configured to select either the output 002 for SQC/DDC or the output 003 for NSQC and passes it to a modulo extraction circuit 607. The modulo extraction circuit 607 is configured to extracts some LSBs of the received value, forming an output 005. In some embodiments, the modulo scaling circuit 602 requires gain scale values for NSQC. Similarly, the modulo extraction circuit 607 requires the number of LSBs to be extracted for all the different constellations. These parameters for the circuits 602 and 607 are stored in the modulo parameter memory 603. For NSQC, the output at 005 is further scaled by the rescaling circuit 608 forming an output 006. For SQC/DDC the output of the modulo extraction circuit 607 at 005 is selected by a mux circuit 606 and for NSQC the output of the rescaling circuit 006 is selected by the Mux circuit 606 thereby forming the output 007. In some embodiments, output 007 corresponds to the modulo output (as explained above with respect to FIG. 1) associated with the received QAM symbol 001.

At this point, it shall be noted that the output 007 is the output of a modulo operation performed on the output at 002. Both of these are now scaled to a known reference grid. A clipping circuit 609 operates on both the outputs 002 and 007. The parameters from the clipping parameter memory 604 are used for the purpose of clipping. The possible clipped value of 002 is output at 008 and the possible clipped value of 007 is output at 009. The difference of the clipped, scaled receive output 008 and the clipped, scaled modulo output 009 is then given to a correction circuit 610. The correction circuit 610 performs some correction to deal with fixed point computational errors. The output of 610 is the modulo shift parameter 010 (e.g., the modulo shift estimate explained in FIG. 1 above). In some embodiments, 010 is an exact value of the modulo shift needed for 008 in order to produce 009. In some embodiments, the clipping circuit 609 and the correction circuit 610 can be mapped to the modulo post-processing circuit 304b in FIG. 3, and the remaining components (for example, the modulo extraction circuit 607, the rescaling circuit 608, the Mux circuit 606 etc.) can be mapped to the modulo processing circuit 304a in FIG. 3.

Figure 7:
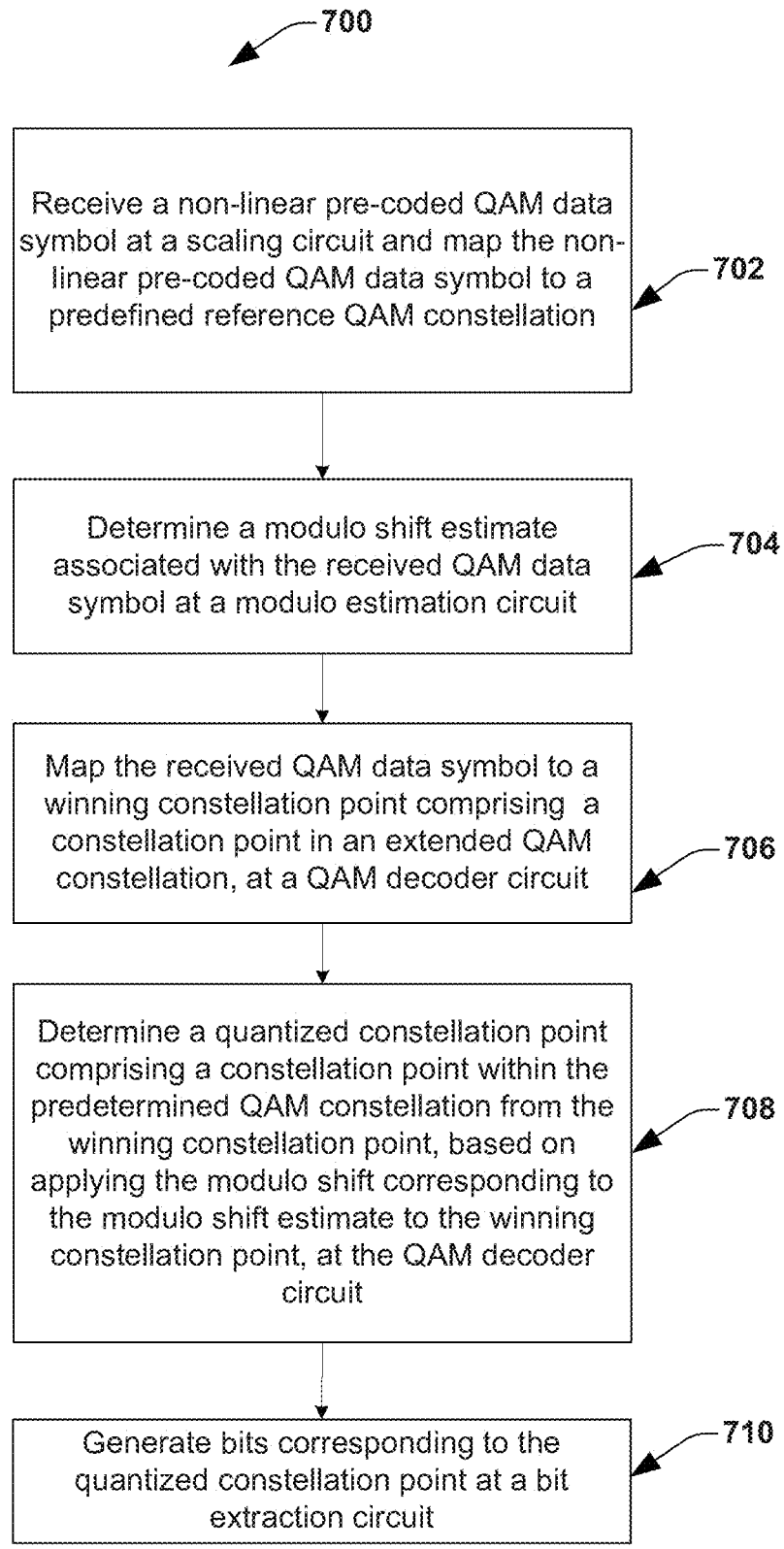
FIG. 7 illustrates a flowchart of a method for a decoder circuit that supports modulo precoded signals, according to one embodiment of the disclosure.

FIG. 7 illustrates a flowchart of a method 700 for a decoder circuit that supports modulo precoded signals, according to one embodiment of the disclosure. The method 700 is explained herein with reference to the decoder circuit 150 in FIG. 1b. However, in other embodiments, the method 700 can be applied to any decoder circuit that supports modulo precoded signals. At 702, a non-linear pre-coded QAM data symbol (e.g., the non-linear pre-coded QAM data symbol 160 in FIG. 1b) is received at a scaling circuit (e.g., the scaling circuit 152 in FIG. 1b) and mapped to a predefined reference QAM constellation, thereby forming a scaled QAM data symbol (e.g., the scaled QAM data symbol 162 in FIG. 1b). In some embodiments, the received non-linear pre-coded QAM data symbol has an unknown modulo shift associated therewith. Further, in some embodiments, the received QAM data symbol is associated with a predetermined QAM constellation comprising a plurality of constellation points. At 704, a modulo shift estimate associated with the received QAM data symbol (or the scaled QAM data symbol associated therewith) is determined at a modulo estimation circuit (e.g., the modulo estimation circuit 154 in FIG. 1b). In some embodiments, the modulo shift estimate comprises a modulo shift that brings the received QAM symbol within the predetermined QAM constellation. In some embodiments, a modulo output associated with the received QAM data symbol is also determined at the modulo estimation circuit. In some embodiments, the modulo estimation circuit is further configured to clip the scaled QAM data symbol, thereby generating a clipped QAM data symbol (e.g., the clipped QAM data symbol 164 in FIG. 1b).

At 706, the received QAM data symbol (or a scaled/clipped QAM data symbol associated therewith) is mapped to a winning constellation point, at a QAM decoder circuit (e.g., the QAM decoder circuit 156 in FIG. 1b). In some embodiments, the winning constellation point comprises a constellation point in an extended QAM constellation comprising a plurality of copies of the predetermined QAM constellation extending in one or more directions from the predetermined QAM constellation. At 708, a quantized constellation point comprising a constellation point within the predetermined QAM constellation is determined from the winning constellation point, based on applying the modulo shift corresponding to the modulo shift estimate to the winning constellation point, at the QAM decoder circuit. At 710, bits corresponding to the quantized constellation point is generated at a bit extraction circuit (e.g., the bit extraction circuit 158 in FIG. 1*b*).

While the methods are illustrated, and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

What is claimed is:

1. A decoder circuit associated with a receiver circuit, the decoder circuit comprising:
    a modulo estimation circuit configured to:
        receive a non-linear pre-coded quadrature amplitude modulated (QAM) data symbol, having an unknown modulo shift associated therewith, wherein the received QAM data symbol is associated with a predetermined QAM constellation comprising a plurality of constellation points; and
        determine a modulo shift estimate associated with the received QAM data symbol, wherein the modulo shift estimate comprises a modulo shift that brings the received QAM data symbol within the predetermined QAM constellation; and
    a QAM decoder circuit coupled to the modulo estimation circuit and configured to:
        map the received QAM data symbol to a winning constellation point, wherein the winning constellation point comprises a constellation point in an extended QAM constellation comprising a plurality of copies of the predetermined QAM constellation extending in one or more directions from the predetermined QAM constellation; and
        determine a quantized constellation point comprising another constellation point within the predetermined QAM constellation from the winning constellation point, based on applying the modulo shift corresponding to the modulo shift estimate to the winning constellation point.

2. The circuit of claim 1, wherein the modulo estimation circuit is further configured to clip the received QAM data symbol to generate a clipped QAM data symbol, based on a size of a maximum allowable size of the extended QAM constellation.

3. The circuit of claim 1, wherein the QAM decoder circuit comprises a quantizer circuit configured to determine a plurality of cosets associated with the received QAM data symbol, wherein the plurality of cosets comprises a plurality of nearest constellation points relative to the received QAM data symbol, in the extended QAM constellation, prior to determining the winning constellation point.

4. The circuit of claim 3, wherein the QAM decoder circuit further comprises a distance computation circuit configured to determine a plurality of constellation distances comprising respective distances between the received QAM data symbol and the plurality of cosets, prior to determining the winning constellation point.

5. The circuit of claim 4, wherein the QAM decoder circuit further comprises a coset processing circuit configured to determine a winning coset comprising the winning constellation point, from the plurality of cosets associated with the received QAM data symbol, based on the constellation distances, in accordance with a predetermined distance criteria.

6. The circuit of claim 5, wherein the QAM decoder circuit further comprises a modulo operation circuit configured to perform a modulo operation that applies the modulo shift corresponding to the modulo shift estimate on the winning constellation point, in order to determine the quantized constellation point.

7. The circuit of claim 3, wherein the quantizer circuit, when the predetermined QAM constellation associated with the received QAM data symbol comprises a diamond shaped constellation, is configured to rotate the received QAM data symbol by a predetermined rotation angle, prior to determining the plurality of cosets associated with the received QAM data symbol, accordingly generating a plurality of rotated cosets, in order to determine the winning constellation point.

8. The circuit of claim 4, when the predetermined QAM constellation associated with the received QAM data symbol comprises a one bit constellation, the plurality of cosets comprises two cosets.

9. The circuit of claim 7, wherein a distance computation circuit, when the predetermined QAM constellation associated with the received QAM data symbol comprises the diamond shaped constellation, is configured to determine a plurality of constellation distances based on the rotated received QAM data symbol and the plurality of rotated cosets.

10. The circuit of claim 8, when the predetermined QAM constellation associated with the received QAM data symbol comprises a one bit constellation, the plurality of constellation distances comprises one bit constellation distances determined based on a pair of received 1-bit symbols.

11. The circuit of claim 10, when the predetermined QAM constellation associated with a pair of received QAM data symbols comprises a pair of one-bit constellations, the plurality of constellation distances comprises two-bit constellation distances determined based on individual distances for the pair of received 1-bit symbols.

12. The circuit of claim 1, further comprising a scaling circuit coupled to the modulo estimation circuit and configured to map the non-linear pre-coded QAM data symbol to a predefined reference QAM constellation, prior to providing the non-linear pre-coded QAM data symbol to the modulo estimation circuit.

13. The circuit of claim 1, further comprising a bit extraction circuit coupled to the QAM decoder circuit and configured to generate bits corresponding to the quantized constellation point.

14. The circuit of claim 2, wherein the modulo estimation circuit comprises a modulo processing circuit configured to determine a modulo output associated with the received QAM data symbol, prior to determining the modulo shift estimate.

15. The circuit of claim 14, wherein the modulo estimation circuit further comprises a modulo post-processing circuit configured to receive information on the modulo output and determine the modulo shift estimate based thereon.

16. The circuit of claim 15, wherein the modulo post-processing circuit is further configured to clip the received QAM data symbol and generate the clipped QAM data symbol.

17. A receiver circuit in a communication system, the receiver circuit comprising:
 a decoder circuit comprising:
  a modulo estimation circuit configured to:
   receive a non-linear pre-coded quadrature amplitude modulated (QAM) data symbol, having an unknown modulo shift associated therewith, wherein the received QAM data symbol is associated with a predetermined QAM constellation comprising a plurality of constellation points; and
   determine a modulo shift estimate associated with the received QAM data symbol, wherein the modulo shift estimate comprises a modulo shift that brings the received QAM data symbol within the predetermined QAM constellation; and
  a QAM decoder circuit coupled to the modulo estimation circuit and configured to:
   map the received QAM data symbol to a winning constellation point, wherein the winning constellation point comprises a constellation point in an extended QAM constellation comprising a plurality of copies of the predetermined QAM constellation extending in one or more directions from the predetermined QAM constellation; and
   determine a quantized constellation point comprising another constellation point within the predetermined QAM constellation from the winning constellation point, based on applying the modulo shift corresponding to the modulo shift estimate to the winning constellation point.

18. The receiver circuit of claim 17, further comprising a maximum extended constellation size memory circuit coupled to the decoder circuit configured to store information on a maximum allowable size of the extended QAM constellation supported by the receiver circuit.

19. The receiver circuit of claim 18, further comprising a receiver processing circuit coupled to the maximum extended constellation size memory circuit and configured to provide information on the maximum allowable size of the extended QAM constellation stored in the maximum extended constellation size memory circuit to a transmitter circuit associated with the communication system, prior to receiving the non-linear precoded QAM data symbol at the receiver circuit.

20. A method for a decoder circuit associated with a receiver circuit in a communication system, the method comprising:
 receiving a non-linear pre-coded quadrature amplitude modulated (QAM) data symbol, having an unknown modulo shift associated therewith, at a modulo estimation circuit, wherein the received QAM data symbol is associated with a predetermined QAM constellation comprising a plurality of constellation points; and
 determining a modulo shift estimate associated with the received QAM data symbol, at the modulo estimation circuit, wherein the modulo shift estimate comprises a modulo shift that brings the received QAM data symbol within the predetermined QAM constellation;

mapping the received QAM data symbol to a winning constellation point, at a QAM decoder circuit that is coupled to the modulo estimation circuit, wherein the winning constellation point comprises a constellation point in an extended QAM constellation comprising a plurality of copies of the predetermined QAM constellation extending in one or more directions from the predetermined QAM constellation; and determining a quantized constellation point comprising another constellation point within the predetermined QAM constellation from the winning constellation point, based on applying the modulo shift corresponding to the modulo shift estimate to the winning constellation point, at the QAM decoder circuit.

21. The method of claim 20, further comprising mapping the non-linear pre-coded QAM data symbol to a predefined reference QAM constellation, at a scaling circuit, prior to receiving the non-linear pre-coded QAM data symbol at the modulo estimation circuit.

22. The method of claim 20, further comprising generating bits corresponding to the quantized constellation point at a bit extraction circuit.

23. The method of claim 20, wherein mapping the received QAM data symbol to the winning constellation point comprises determining a plurality of cosets associated with the received QAM data symbol, wherein the plurality of cosets comprises a plurality of nearest constellation points relative to the received QAM data symbol, in the extended QAM constellation, at a quantizer circuit associated with the QAM decoder circuit.

24. The method of claim 23, wherein mapping the received QAM data symbol to the winning constellation point further comprises determining a plurality of constellation distances comprising respective distances between the received QAM data symbol and the plurality of cosets, at a distance computation circuit associated with the QAM decoder circuit.

25. The method of claim 24, wherein mapping the received QAM data symbol to the winning constellation point further comprises determining a winning coset comprising the winning constellation point, from the plurality of cosets associated with the received QAM data symbol, based on the plurality of constellation distances, in accordance with a predetermined distance criteria, at a coset processing circuit associated with the QAM decoder circuit.

* * * * *